United States Patent [19]

Ott et al.

[11] Patent Number: 4,505,589
[45] Date of Patent: Mar. 19, 1985

[54] PROCESS AND APPARATUS FOR THE COLORIMETRIC ANALYSIS OF PRINTED MATERIAL

[75] Inventors: Hans Ott; Rolf Boegli, both of Regensdorf; Ulrich Birch, Wallisellen, all of Switzerland; Helmut Kipphan, Schwetzingen; Gerhard Löffler, Walldorf, both of Fed. Rep. of Germany

[73] Assignee: Gretag Aktiengesellschaft, Regensdorf, Switzerland

[21] Appl. No.: 363,538

[22] Filed: Mar. 30, 1982

[30] Foreign Application Priority Data

Apr. 3, 1981 [CH] Switzerland .................. 2283/81

[51] Int. Cl.³ .............................................. G01J 3/50
[52] U.S. Cl. .................................... 356/402; 356/406; 356/407; 356/425; 364/526; 250/226
[58] Field of Search ................ 356/402, 406, 407, 416, 356/425; 250/226; 364/526

[56] References Cited

U.S. PATENT DOCUMENTS 3,995,958 12/1976 Pfahl et al. .................. 356/425 X
4,003,660 1/1977 Christie, Jr. et al. ......... 356/425 X
4,289,405 9/1981 Tobias .......................... 356/407

Primary Examiner—F. L. Evans
Attorney, Agent, or Firm—Burns, Doane, Swecker & Mathis

[57] ABSTRACT

On a measuring table (1), a bridge (2) extends over a printed sheet (5) to be measured. A measuring carriage (3) carrying a three color-simultaneous measuring head is arranged on the bridge (2) for linear movement in a back-and-forth manner along a desired path on the printed sheet. For control of the movement of the measuring head during measuring runs and for the evaluation of the measured data, a computer (7) with an integrated image display terminal and a processor system (6) controlled by the computer, is provided with the necessary interfaces. The analysis of a color measuring strip (MS) located along the desired path on the printed sheet is effected in two phases. In a first, so-called recognition run the measuring strip is scanned stepwise with high resolution in all three color channels, for the purpose of an analysis of its configuration. By means of flat locations in the density variations, effective positions (e.g., the centers) in the measuring fields are determined as possible measuring positions for subsequent measuring runs. During the measuring runs the measuring strip is measured only at the measuring positions determined during the recognition and the measured data obtained in this manner are transmitted for processing and/or display to the computer (7). By the division of the measurements into a recognition and a measuring run, coupled with the determination of measuring positions by means of flat locations in the density variations, a practically completely automatic evaluation of the color measuring strips independently of their configuration and without the need of prior knowledge of the strips by the apparatus, is rendered possible.

31 Claims, 18 Drawing Figures

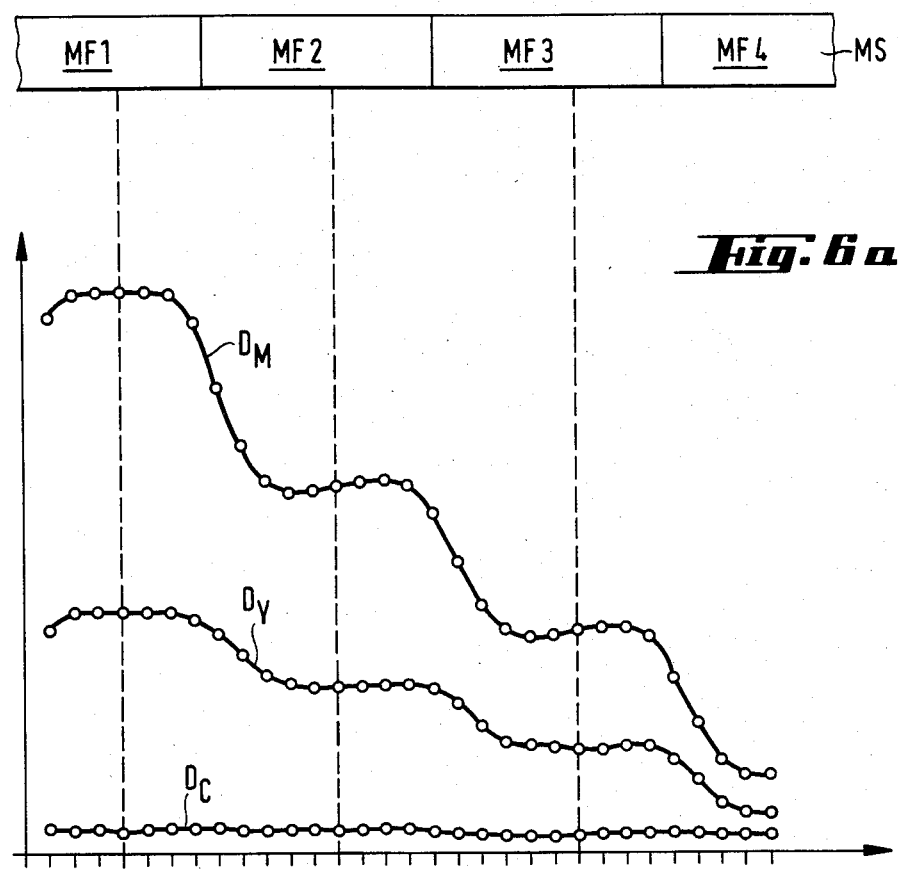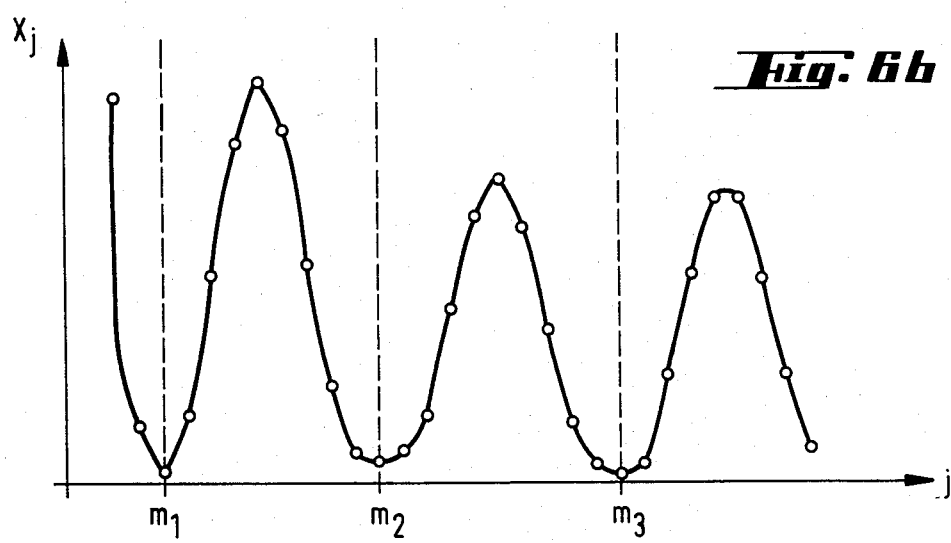

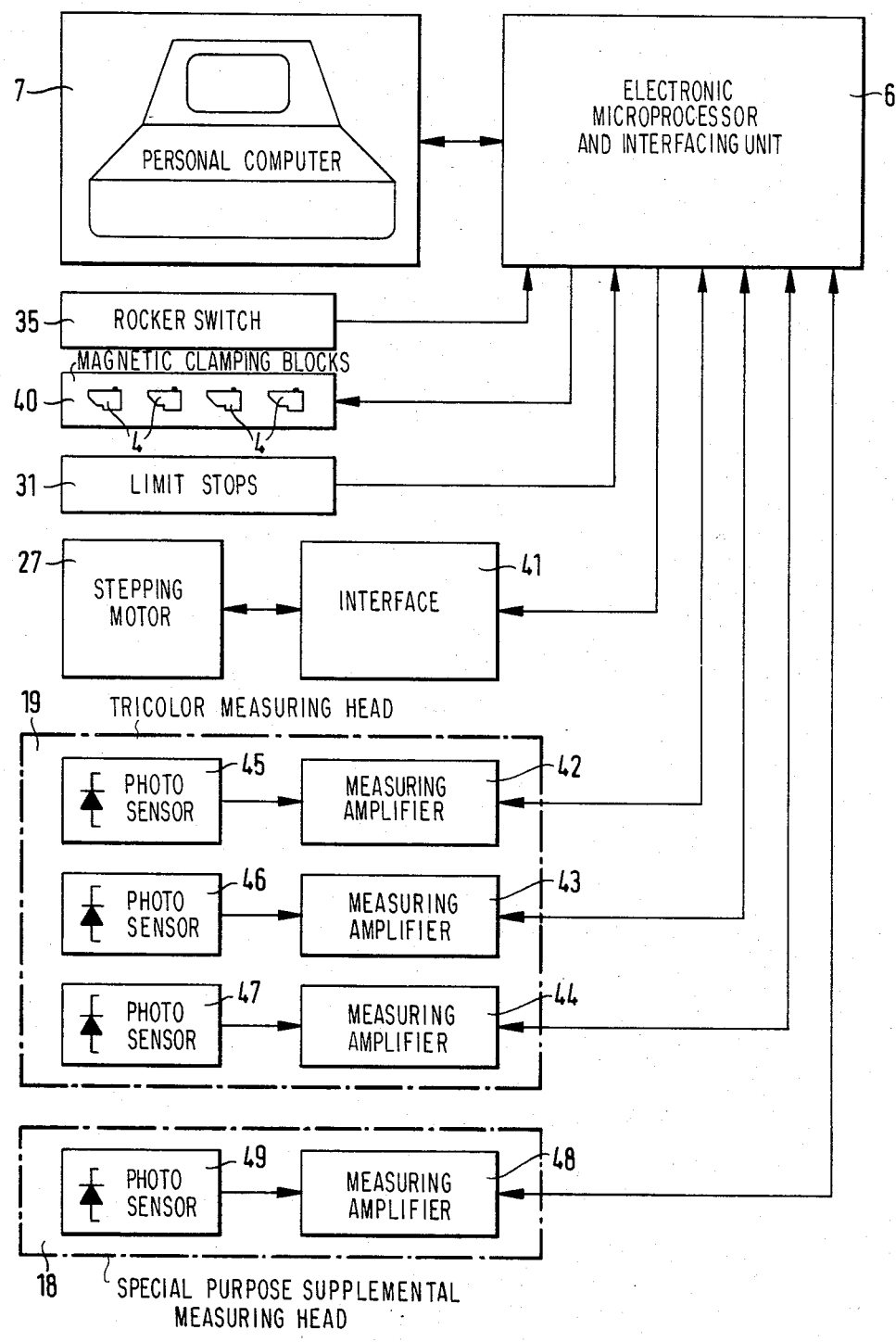

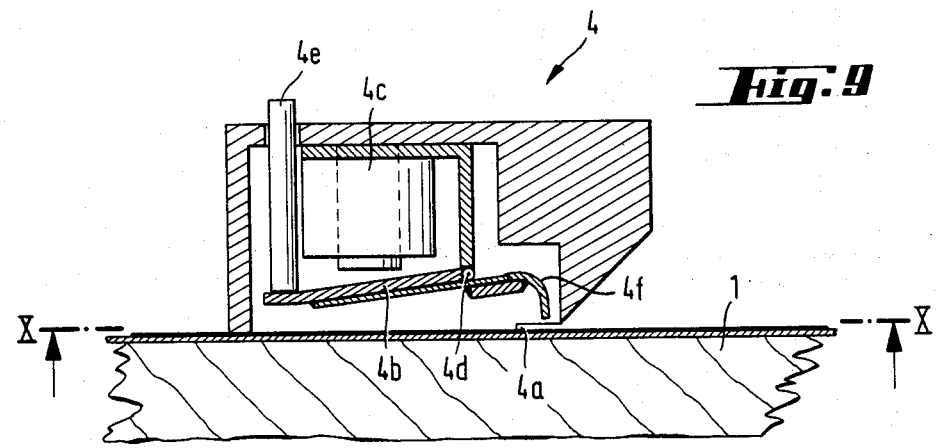
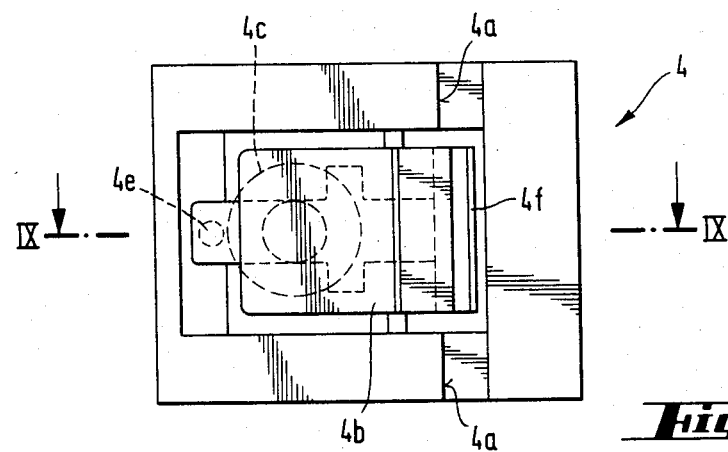

PROCESS AND APPARATUS FOR THE COLORIMETRIC ANALYSIS OF PRINTED MATERIAL

BACKGROUND OF THE INVENTION

1. Field of the Invention

The present invention relates to a process and apparatus for the analysis of a printed material and, more particularly, to a process and apparatus for accurate colorimetric analysis of a printed color measuring strip to produce color information from the printed color measuring strip by scanning the strip with a densitometer in an accurately controlled manner.

2. State Of The Prior Art

Devices of the type set forth herein, socalled densitometers are widely used, particularly in the printing industry. They make it possible for the printer to objectively evaluate the quality of a printed product, and to correspondingly set or adjust the printing apparatus to obtain a desired result, by means of the colorimetric analysis of a co-printed color measuring strip and the comparison of the measured values with those desired. Details of such densitometer measuring systems may be found in the prior art literature and, in particular, in U.S. Pat. Nos. 4,200,932 and 3,995,958 and the references cited therein.

For obvious reasons, it is desirable to automate the measuring and evaluation of the densitometric color measuring strips as far as possible. Consequently, a number of different scanning densitometers have become available for this purpose. Typically, they are equipped with a measuring head and appropriate controls to move the head back and forth on a bridge extending over the printed sheet, and thus they are capable of scanning and taking measurements from the strip in a more or less automatic manner.

A fundamental problem in the automatic measurement of densitometric strips is the detection and identification of the individual measuring fields of the strip and the determination of a suitable measuring position in order to obtain correct correlation of the measuring signals from the strip with the individual measuring fields. In this regard, it would be most desirable if the measuring head and its electronic controller could together provide appropriate orientation from the information contained in the measuring strip alone, without resort to the unusual, and as a rule undesirable, special situation in which auxiliary means such as synchronizing symbols or the like are used.

In the case of the scanning densitometer described in No. DE-A-29 01 980, the problem is addressed by continuously scanning the measuring strip and twice differentiating the measuring signal produced. The two differentiations produce zero crossings of the signal at the boundaries of the measuring fields. A location following a zero crossing at a certain, predetermined distance from the crossing, and thus from the boundary of a measuring field, is defined as the center of the field and thus as a suitable measuring location. To correct simply the aperture errors occurring in this mode of operation, color filters preceding the measuring head are changed in relation to the structure of the densitometric strip to be measured, thus assuring that only jumps in density in one direction are considered in the detection of measuring field boundaries.

With this known densitometer, the detection of measuring field boundaries is assured only if solid fields of an adequately high density and constantly changing colors follow each other in the measuring strip. A further, much more important disadvantage lies in the fact that it is necessary for the densitometer to have information as to both the configuration and the structure of the measuring strip and the nominal lengths of the measuring fields, so that the color filters may be changed in an appropriate manner and the centers of the fields determined as the measuring positions.

In U.S. Pat. No. 3,995,958, another scanning densitometer operating automatically to some extent, is described. This densitometer scans the measuring strip in discrete steps, and the determination of a measured change in color density of a certain value during two successive scanning steps is utilized to indicate a transition between two "blocks" with different color properties on the measuring strip. The value measured at a location following the point of transition determined in accordance with the abovementioned criterion is chosen as the valid measured value of color density for a given block. Following each block transition, a color filter change is effected, in order to insure an adequate jump in density for the next block transition.

A disadvantage of this known densitometer resides in the requirements of a highly specific configuration of the color measuring strip, i.e., a cyclic sequence of overlapping solid or empty blocks. Furthermore, the color sequence of the individual blocks must be known and supplied to the densitometer or to its controller. The lengths of the individual blocks must also be known in order to determine effective measuring locations on the basis of "block" transition detected in this relatively inaccurate manner.

OBJECT AND BRIEF SUMMARY OF THE INVENTION

It is the object of the present invention to avoid the foregoing disadvantages and to provide an improved process and apparatus of the above described type such that extensive and fully automated scanning of arbitrary color measuring strips becomes possible, independently of the configuration of the measuring strip and without the need to know its structure prior to the scanning process. In particular, no synchronizing marks or the like, and further no filter changes are required.

According to the invention, the foregoing object is attained in two ways, each of which provides a substantial improvement over known prior art. One aspect of the invention comprises the determination of the effective measuring positions of densitometer color measuring strips (i.e., the places or scanning locations at which the scanning or measuring signal having validity for the measuring field of the strip in question should be derived) by means of an analysis of the color measuring strip in a so-called recognition run and the storage of the measuring positions obtained in this manner. Because the measuring positions are stored, the recognition run must be effected only once for a particular color strip format and can therefore be performed with appropriate care and precision. During the measuring of further printed sheets with the same color measuring strip, the measuring positions are already known and the strip must be scanned at these positions only. Naturally the subsequent measurements at the stored locations proceed much more rapidly and amply compensate for the time required for the relatively slow recognition run.

Another aspect of the present invention relates more specifically to the mode of determining the measuring positions themselves during the recognition run. The measuring positions are selected in the area of relatively flat regions in the color density variations, thereby providing a much more reliable correlation of the measured values with the individual measuring fields of the color measuring strip, with practically no knowledge of the configuration of the measuring strip being necessary.

As mentioned hereinabove, each of the individual measuring aspects according to the invention facilitates and improves the mechanical densitometric analysis of color measuring strip by itself. Their combination, however, enhances this improvement even further.

BRIEF DESCRIPTION OF THE DRAWINGS

The foregoing objects and advantages of the present invention will become apparent to one skilled in the art to which the invention pertains from the following detailed description when read in conjunction with the drawings, in which:

FIGS. 6 and 7 are diagrams graphically illustrating measured values in relation to measuring strips to assist with an understanding of the apparatus and process of the invention;

FIG. 8 is a functional block diagram of the electrical parts of an apparatus according to the present invention;

FIGS. 9 and 10 are, respectively, a vertical cross section and a bottom view of a clamping block.

DETAILED DESCRIPTION

Figure 1:
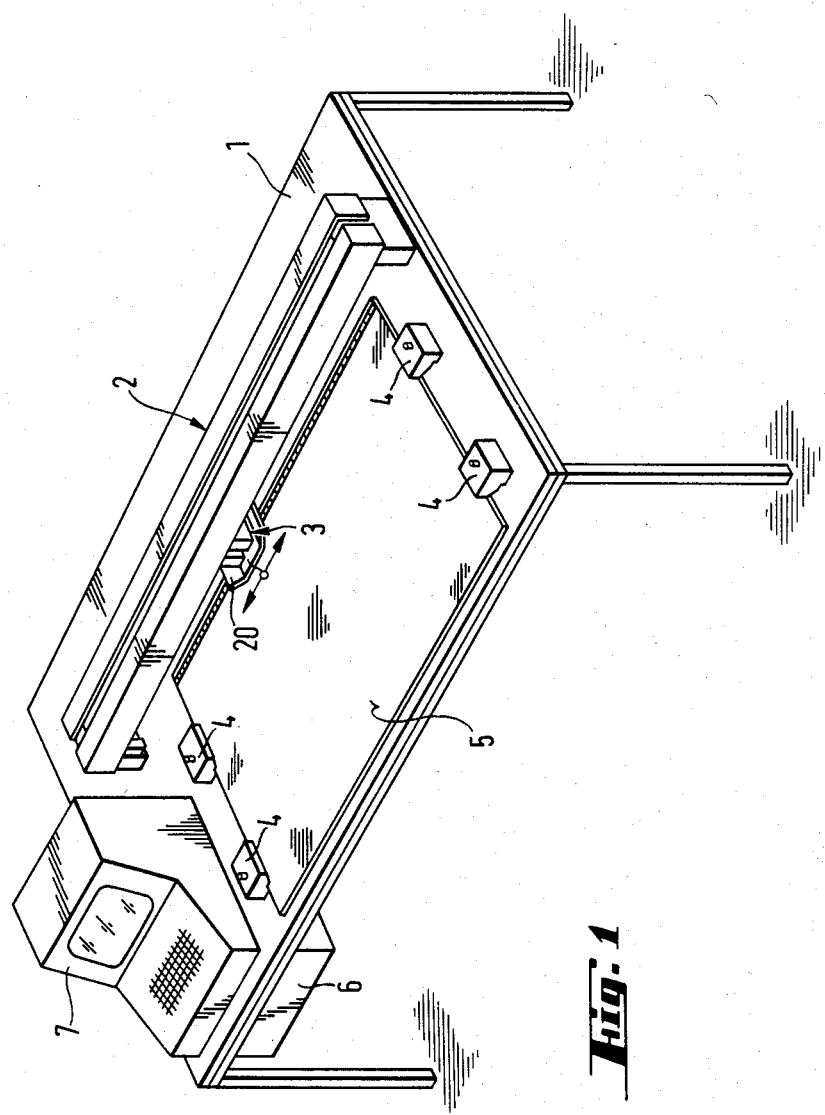
FIG. 1 shows a somewhat simplified perspective view of one examplary embodiment of an apparatus according to the present invention.

The apparatus shown in FIG. 1 comprises a measuring table 1. Located on and under the measuring table 1 are measuring bridge 2 with a measuring carriage 3, four clamp blocks 4 for holding the printed sheet 5 to be measured, an electronic unit 6 and a computer 7, which preferably is a small, "personal" computer. The flat top of the table 1 is preferably made of wood and is equipped, under a protective top layer, with a steel sheet making it possible to hold the printed sheet 5 by means of magnets or the like. The electronic unit 6 is in the form of a plug-in module. The personal computer 7, equipped with an image screen terminal, is rotatably mounted on the table. The measuring carriage 3, the electronic unit 6 and the personal computer 7 are electrically connected to each other by wiring which is not shown.

The electronic unit 6 comprises a conventional microprocessor system and conventional interfaces for the processing of the measuring and control signals entered into it or generated by it. The processor system in the electronic unit 6 works with the personal computer 7 in a so-called master-slave operation, wherein the personal computer exercises the control function and effects the evaluation of the measured and input data, while the system in the electronic unit is responsible for the execution of the measurements and the movements of the measuring carriage (see also FIG. 8).

Figure 2:
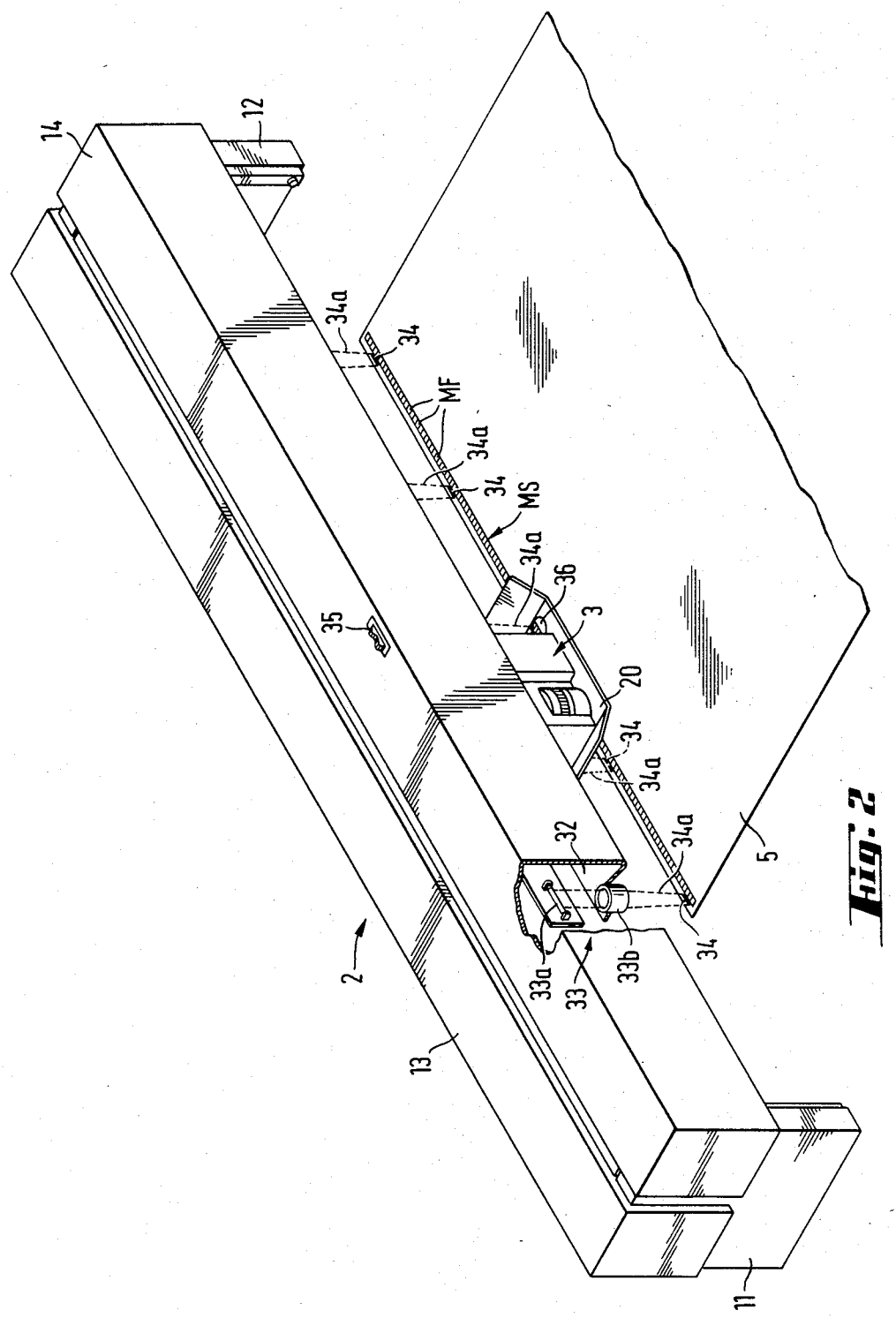
FIG. 2 is a partially cut-away view of the measuring bridge of FIG. 1.
Figure 3:
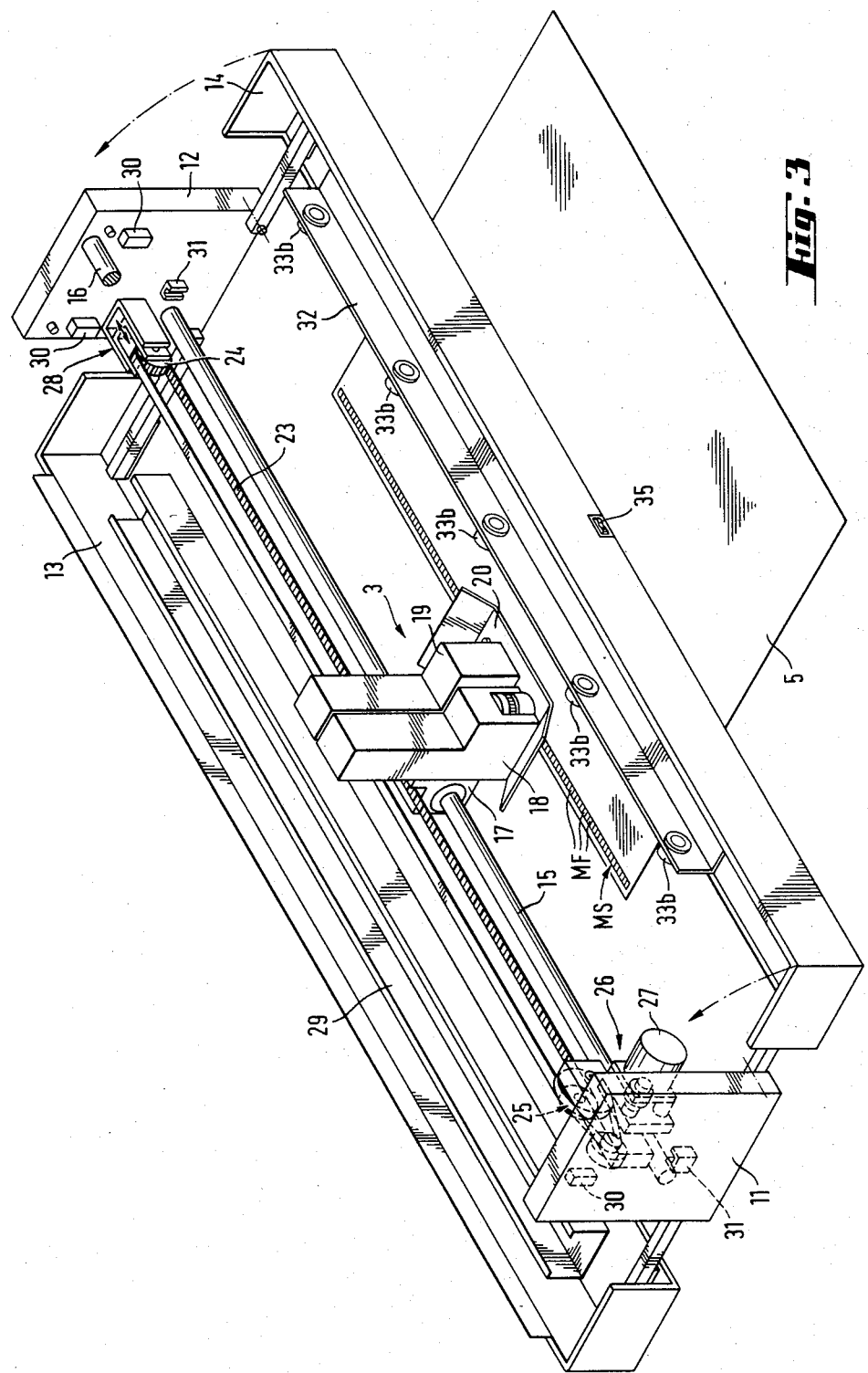
FIG. 3 illustrates the measuring bridge of FIG. 2 in a partially disassembled and opened state.

In FIGS. 2 and 3, the measuring bridge is shown enlarged. It comprises two vertical, laterally extending end supports 11 and 12, which carry the remaining parts of the bridge, together with two cover hoods 13 and 14, covering the intermediate space between the two lateral end supports 11 and 12. The hood covers are pivotally supported on the lateral supports, so that they may be opened laterally into the position shown in FIG. 3, thereby providing access to the internal parts of the measuring bridge. The two lateral end supports 11 and 12 are connected to each other by a guide shaft 15 and a connecting rod 16, only a portion of which is illustrated in FIG. 3.

Figure 5:
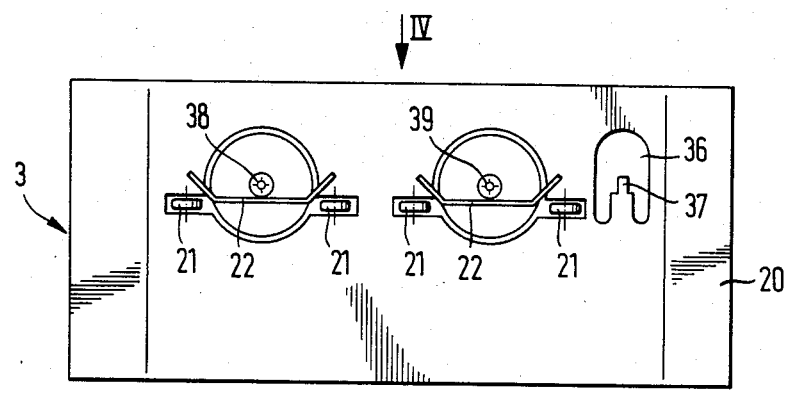
FIG. 5 is a bottom view of the measuring head of FIG. 3.
Figure 4:
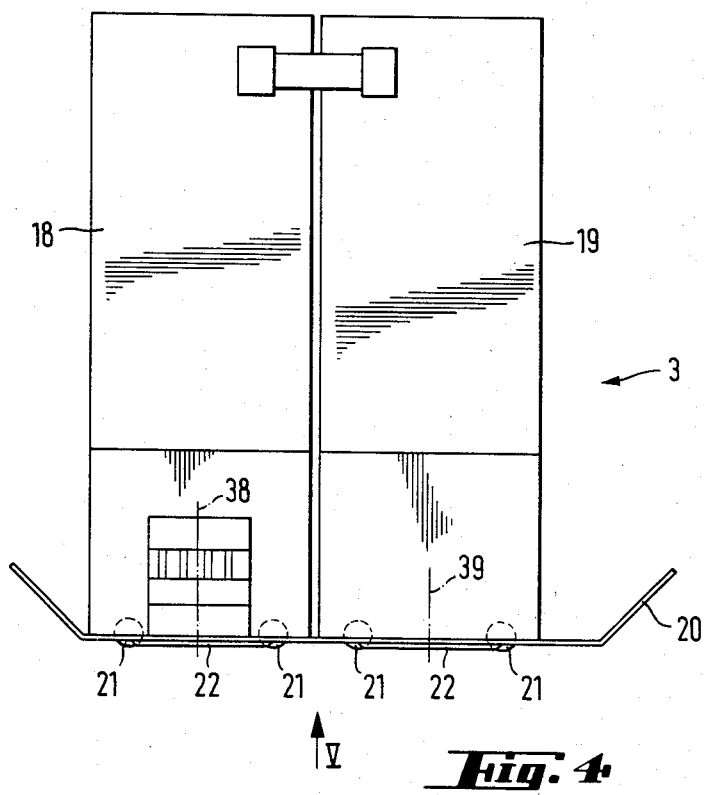
FIG. 4 is a front elevation of the measuring head of FIG. 3.

On the guide shaft 15, a measuring carriage generally indicated at 3 may be moved back and forth and is rotatable around the shaft. The measuring carriage 3 includes a guide block 17 equipped with two bearings and two measuring heads 18 and 19 fastened to them, together with a guide or holding plate 20, bent upward on both sides. The measuring carriage is equipped on its bottom side with rolls 21 and two spring supported holding shackles 22. (FIGS. 4 and 5). During its operation, the measuring carriage rests with its rolls 21 on the printed sheet 5 to be measured, and thus the distance between the measuring heads 18 and 19 and the individual fields MF of a measuring strip MS on the printed sheet 5 remains constant at all times.

The measuring heads are fundamentally of the type described in U.S. Pat. No. 4,078,858, with the measuring head 19 measuring simultaneously three color channels, while the other head 18 is designed for one channel only, but equipped with manually, or possibly programmably, changeable filters. The measuring head 18 is intended for special purposes such as the measuring of house and decorative printing inks, while for normal measurements the simultaneous tri-color head 19 is used. A toothed belt 23, on the lower side of which guide block 17 is fastened is provided to drive the measuring carriage 3. Belt 23 is guided over two rolls or rollers 24 and 25, rotatably supported on each of the lateral end supports 11 and 12. The roller 25 on the left hand side of FIG. 3 is driven by a stepping motor 27 through a belt reduction gear 26. The other roller 24 is supported on a bearing in a clamping device 28 so as to rotate freely. The stepping motor 27 and the reduction gear 26 are dimensioned so that the belt 23 and thus the measuring carriage 3 are transported 0.1 mm for each complete step of the motor.

In the rear hood 13 a guide rail 29 containing a flat electrical conductor, not shown, electrically connects the measuring carriage 3 to the electronic unit 6. Rapid acting couplings indicated by the blocks 30 are disposed on the lateral end supports 11 and 12 for fastening of the two hoods 13 and 14 in the closed position. A forked limit stop 31 on each end support electrically cooperates with a metal strip or the like, not shown, on the guide block 17 or the measuring carriage 3, so that the carriage is automatically halted, when it approaches one or the other of the end supports within a predetermined minimum distance, for example as the result of a control error.

In the front hood 14 a holder 32 with a U-shaped cross section is mounted, and five marking lamps 33, uniformly distributed over the length of the measuring bridge, are arranged in the holder. Each of the lamps 33 consists of a light source in the form of a so-called line lamp 33a in the upper leg of the holder and projection optics 33b in the lower leg. The lamps produce on the printed sheet 5, five luminous marking lines 34 located on a single line, each approximately 20 mm long. The beams of the lamps 33 are indicated in FIG. 2 by the broken lines 34a. The luminous lines serve as a way to align the printed sheet so that the measuring strip MS is located exactly under the moving path of the two measuring heads 18 and 19. For the purpose of the exact alignment of the luminous lines themselves, the optical projection device 33b is eccentrically held and is arranged rotatably in the holder. Naturally, in place of the luminous lines, light dots or crosses or the like may be used as markings.

Finally, a rocker switch 35 is provided on the top side of the front hood 14, so that the measuring carriage 3 may be moved by manual control to any measuring position desired along the measuring strip MS. To facilitate this manual positioning, the holding plate 20 is equipped with a sight window 36 (FIG. 5), the configuration of which forms a pointer 37 in fixed optical coordination with the optical axes 38 and 39 of the two measuring heads 18 and 19.

The configuration of the magnetic clamp blocks 4 is shown in FIGS. 9 and 10. Each block 4 comprises two sheet stops 4a. Between these stops, the arm 4b of a holding magnet 4c is arranged to pivot around a horizontal axis 4d. A vertically disposed pin 4e located near the rear part of the block 4 is mechanically coupled to the arm 4b and is displaced vertically by the arm 4b to optically indicate the position of the arm. When the magnet 4c is energized, the arm 4b is drawn upward and simultaneously downwardly depresses a resilient pressure element 4f on the arm 4b so that an abutting printed sheet is clamped tight. The sheet clamp blocks 4 are actuated automatically by the electronic unit 6, prior to the activation of the measuring carriage 3.

The electrical connections of the individual parts of the measuring bridge with each other and with the electronic unit are not shown in the drawing for the sake of clarity.

A basic block diagram showing the interconnections of the electrical parts of the apparatus, to the extent necessary for the understanding of the mode of operation is shown in FIG. 8. It should be understood that what is being shown is of a purely exemplary character and the individual functions of the apparatus may be effected readily by means of other implementations.

The central part of the circuit, as mentioned hereinabove, is the computer 7 which is preferably a commercially available personal" computer. In principle, any small computer or microcomputer may be used. The personal computer is connected to the microprocessor system of the electronic unit 6, to which, again by wiring not shown, the rest of the electrical and electronic structural groups and parts of the apparatus are connected. These are the rocker switch 35 for the manual control of the measuring carriage, the four magnetic clamping blocks 4 (designated in their entirety by block 40), for the holding of the printed sheet on the measuring table, the stop 31 to limit the movement of the carriage, an interface 41 to control the stepping motor 27, three measuring amplifiers 42–44 for the three photosensors 45–47 in the simultaneous tri-color measuring head 19 and a measuring amplifier 48 for the photosensor 49 in the special or supplemental measuring head 18.

At all of the analog-digital circuit transitions, analog-digital converters are further provided, which are not shown.

As will be appreciated from the foregoing, the basic configuration of the device and its basic mode of operation are like that of known devices, for example, the apparatus described in greater detail in U.S. Pat. No. 3,995,958, in that the measuring carriage 3 is guided manually or automatically along the measuring strip MS on the printed sheet 5, and the reflection values detected by the measuring head 18 or 19 whichever is active) are processed and evaluated electronically (here in the electronic unit 6 and the personal computer 7). Hereinafter, the mode of operation of the apparatus and of the measuring process according to the invention, and the differences from the above-mentioned apparatus, are explained in more detail.

One of the fundamental aspects of the process according to the invention lies in dividing the measuring process into two parts; a so-called recognition run and one or more subsequent measuring runs. In the recognition run, effected first, color measuring strips unknown to the apparatus are periodically scanned in short intervals and the configuration of the strip and the most appropriate measuring locations on the strip determined from the scanning values obtained. In the subsequent measuring runs, the color densities are determined at the measuring positions determined during the recognition run on any number of printed sheets with the same measuring strip, and the color densities so determined are passed on for evaluation by the microprocessor system. On the first printed sheet the measuring run may naturally be effected together with the recognition run.

Figure 11:
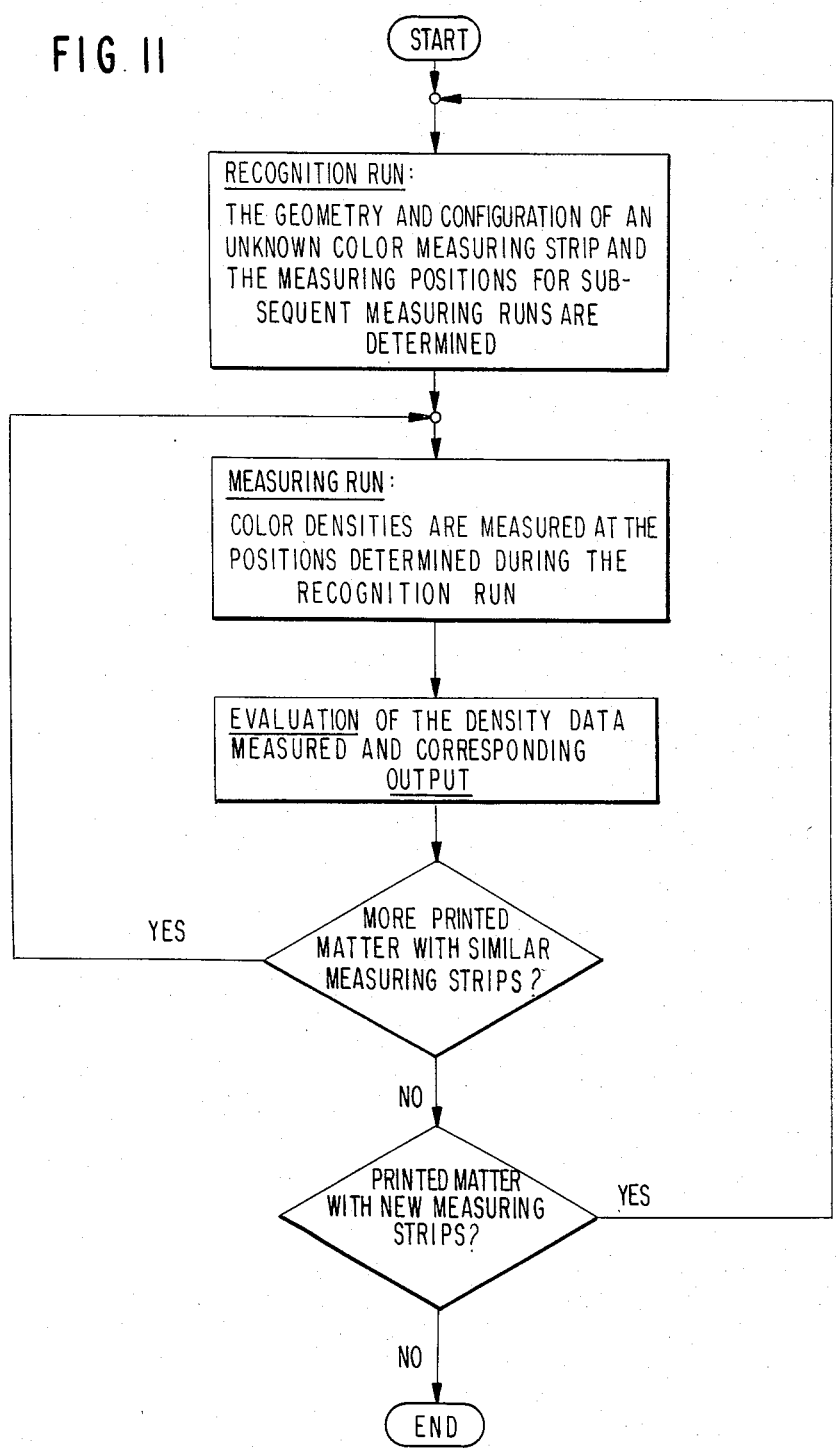
FIGS. 11-15 are logic flow diagrams illustrating the sequence of operations performed in accordance with various aspects of the present invention.

In the logic flow diagram presented in FIG. 11, the principles of this first aspect of the invention (i.e., performing the recognition run to determine measuring positions, followed by measuring runs using the determined measuring positions) is shown in a manner designed to clearly illustrate the above-desired process.

FIG. 6a shows a section of a typical density variation, such as is generated during the periodic scanning of a measuring strip MS during the recognition run. On the abcissa of FIG. 6a the increments of advance (steps) of the measuring carriage and measuring head, designated by i, are plotted to scale in relation to the measuring strip MS. The three curves $D_M$, $D_Y$ and $D_C$ show the variations of the simultaneously measured density values $D_{Mi}$, $D_{Yi}$ and $D_{Ci}$ for the three colors magenta, yellow and cyan at the individual scanning points i for the measuring fields designated by MF1 to MF4 of the section of the measuring strip MS.

As may be seen, the density variation curves exhibit, within the individual measuring fields MF, flat locations or regions of a more or less pronounced nature, while they have relatively steep slopes at the transitions between the individual measuring fields. The centers of these flat regions are possible measuring positions for the measuring runs. The analysis of the configuration of the measuring strip during the recognition run is based on the second fundamental feature of the invention; namely the proper determination of the flat regions within the density variations. In the process, the correct measuring positions are selected from all of the flat regions determined in a manner to be described hereinafter, such that a predetermined minimum length of measuring fields is observed and the occurrence of several measuring positions in longer measuring fields is prevented. This analysis of the geometrical configuration of the measuring strip may be followed by analyses concerning the qualitative type (color, screen type, etc.) of the measured fields.

To detect the flat regions in the density variations, the unknown measuring strip is divided into overlapping intervals of equal length, with a new interval j beginning at each scanning point i and consisting of n scanning points. The length (n−1) times the distance between two scanning points i of the intervals j preferably corresponds approximately to the difference between the minimum field length permitted by the measuring optics and the diameter of the measuring spot of the measuring head.

The standard deviations in each of the intervals or the sum of the absolute values of the measured density variations in each interval are now formed individually for the three colors. The sum of the three standard deviations or the sums of absolute values in the three colors for each interval; or the maximum standard deviation or sum of absolute values, respectively, is then selected. Let us designate the value found in this manner by Xj.

Mathematically, these operations may be expressed as follows:

(A) Interval division:
Interval j=scanning points j to j+n−1
$1 \leq j \leq i_{max} - n + 1$
n=number of scanning points per interval,
$i_{max}$=maximum number of scanning steps (B) Average density values in the three colors in each interval j:

$$\overline{D}_{Cj} = 1/n \sum_{i=j}^{j+n-1} D_{Ci}$$

$$\overline{D}_{Mj} = 1/n \sum_{i=j}^{j+n-1} D_{Mi}$$

$$\overline{D}_{Yj} = 1/n \sum_{i=j}^{j+n-1} D_{Yi}$$

(C) Formation of the sum of the absolute values of the deviations of measured density values from the average value of density of the corresponding interval for each color channel in each interval:

$$A_{Cj} = \sum_{i=j}^{j+n-1} (|D_{Ci} - \overline{D}_{Cj}|)$$

$$A_{Mj} = \sum_{i=j}^{j+n-1} (|D_{Mi} - \overline{D}_{Mj}|)$$

$$A_{Yj} = \sum_{i=j}^{j+n-1} (|D_{Yi} - \overline{D}_{Yj}|)$$

or formation of the empirical standard deviation in each interval individually for each density variation:

$$S_{Cj} = \left[ \frac{1}{n-1} \sum_{i=j}^{j+n-1} (D_{Ci} - \overline{D}_{Cj})^2 \right]^{\frac{1}{2}}$$

$$S_{Mj} = \left[ \frac{1}{n-1} \sum_{i=j}^{j+n-1} (D_{Mi} - \overline{D}_{Mj})^2 \right]^{\frac{1}{2}}$$

$$S_{Yj} = \left[ \frac{1}{n-1} \sum_{i=j}^{j+n-1} (D_{Yi} - \overline{D}_{Yj})^2 \right]^{\frac{1}{2}}$$

(D) Determination of the maximum value from $A_{Cj}$, $A_{Mj}$, $A_{Yj}$ or $S_{Cj}$, $S_{Mj}$, $S_{Yj}$ in each interval:
$A_{jmax} = \max(A_{Cj}, A_{Mj}, A_{Yj})$
respectively
$S_{jmax} = \max(S_{Cj}, S_{Mj}, S_{Yj})$
formation of the sum of $A_{Cj}$, $A_{Mj}$, $A_{Yj}$, respectively $S_{Cj}$, $S_{Mj}$, $S_{Yj}$ in each interval:
$\Sigma A_j = A_{Cj} + A_{Mj} + A_{Yj}$ and $\Sigma S_j = S_{Cj} + S_{Mj} + S_{Yj}$ (E) Selection of one of the values $A_{jmax}$, $S_{jmax}$, $\Sigma A_j$ or $\Sigma S_j$ as the base values $X_j$ for further evaluation.

Plotting of the $X_j$ values as shown in FIG. 6b indicates that the $X_j$ variation exhibits relative minima within the area of the flat locations independently of the selection made. It may thus be concluded that the centers of the intervals for which the $X_j$ variation exhibits relative minima are possible measuring positions. In FIG. 6b, such possible measuring positions are designated $m_1$ to $m_3$.

Figure 7A:
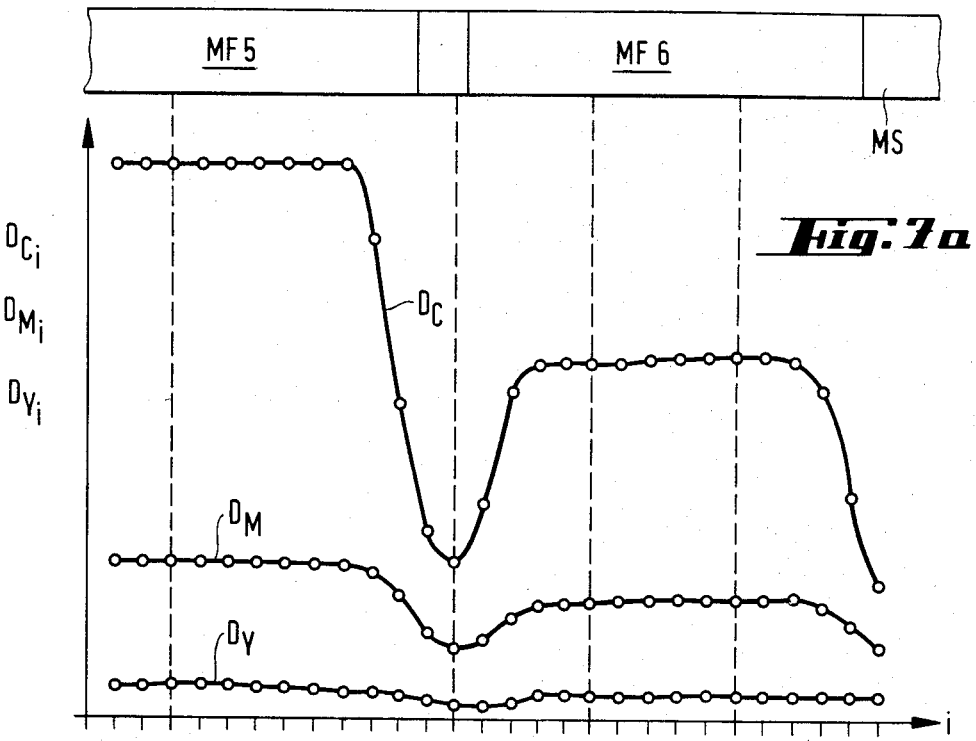
Figure 7B:
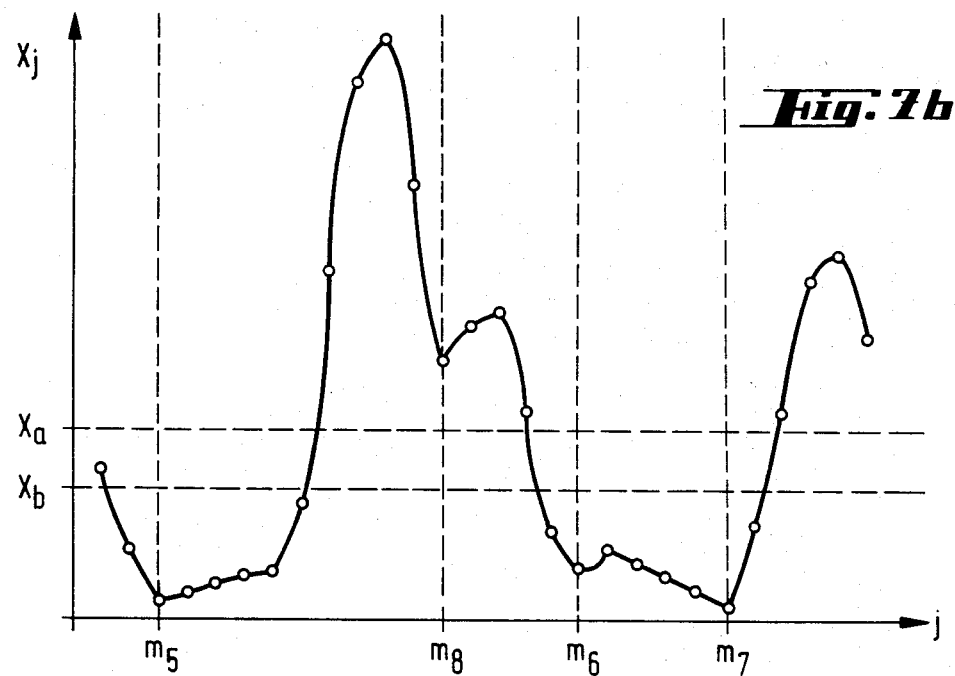

As mentioned hereinabove, actually not all of these possible measuring positions may be useful as effective measuring positions. FIG. 7b shows, for example, the relative minima of the $X_j$ variation also occur in intervals between two measuring fields—for example, between the fields designated by MF 5 and MF 6—or in very small fields intended only for visual control. It also will be appreciated from FIG. 7b that within a certain measuring field—here MF 6—several minima may occur, for example as the result of inhomogeneities.

In order to eliminate these undesirable measuring positions or ambiguities, only minima with Xj values under a certain threshold value $X_a$ are considered. In the example of FIG. 7b this is true for the minima at locations $m_5$, $m_6$ and $m_7$, while the Xj value for the intermediate minimum at location $m_8$ exceeds the threshold value of $X_a$. As an alternative, invalid measuring positions in excessively narrow measuring fields or intervals may be eliminated by taking into consideration the minimum distance between two measuring positions given by the optical measuring apparatus.

To eliminate multiple measuring positions on the same measuring field, a procedure may be followed whereby the three color densities in successive minimum locations are compared and a determination is made whether the minimum locations are on the same measuring field. Alternatively, a test may be applied to determine whether a field boundary is located between two successive minimum locations. Such a boundary is present when, between two minimum locations, an interval exists having a value of Xj which exceeds a second threshold value $X_b$. In FIG. 7b this is true, for example, for the pair of minimum locations $m_8$–$m_6$, while the condition is not valid for the pair of locations $m_6$–$m_7$, and these latter two measuring positions are therefor located in the same measuring field. In this case, one of the two or more positions will be selected, preferably the one with the lowest value of Xj.

With the steps heretofore described applied during the recognition run, with the exception of a few special fields which cannot be recognized or distinguished by the apparatus (for example successive line screen fields of the same color and differing only in the direction of the screen lines), the geometric configuration of an unknown color measuring strip can be determined. With the fundamental procedures described hereinafter, additional information, such as for example, the type of screen, etc. may be obtained by means of the measuring strip, if so desired. The degree of automatic recognition or analysis required depends on how much information is already known to the apparatus concerning the strip in question.

If the type of the measuring strip to be analyzed is known or if the strip to be recognized is a combination of individual pieces of known strips, certain known correlation or comparison processes may be employed for a fully automatic type of determination.

In the case of an unknown measuring strip, certain data concerning the measuring field types to be encountered must be entered into the computing apparatus prior to the recognition run. The apparatus then will make an attempt to determine the geometric configuration of the strip and the types of all the measuring fields. Fields that are not recognized or cannot be determined, must then be defined or specified manually.

For example, semiautomatic field determination would be possible by entering, prior to the recognition run, the desired density values with suitable tolerances of all existing field types.

Naturally the recognition run may also be effected under manual control. To do so, the measuring head is positioned manually on the individual measuring fields and the necessary data concerning the field type involved entered by means of a keyboard. The density values and the measuring position are automatically determined and recorded.

In the case in which the measuring strip characteristics are known and can be prestored in the apparatus, the recognition run may be omitted. In order to take into consideration possible stretching of the paper, only the positions of the first and the last measuring field may be entered manually.

Figure 12:
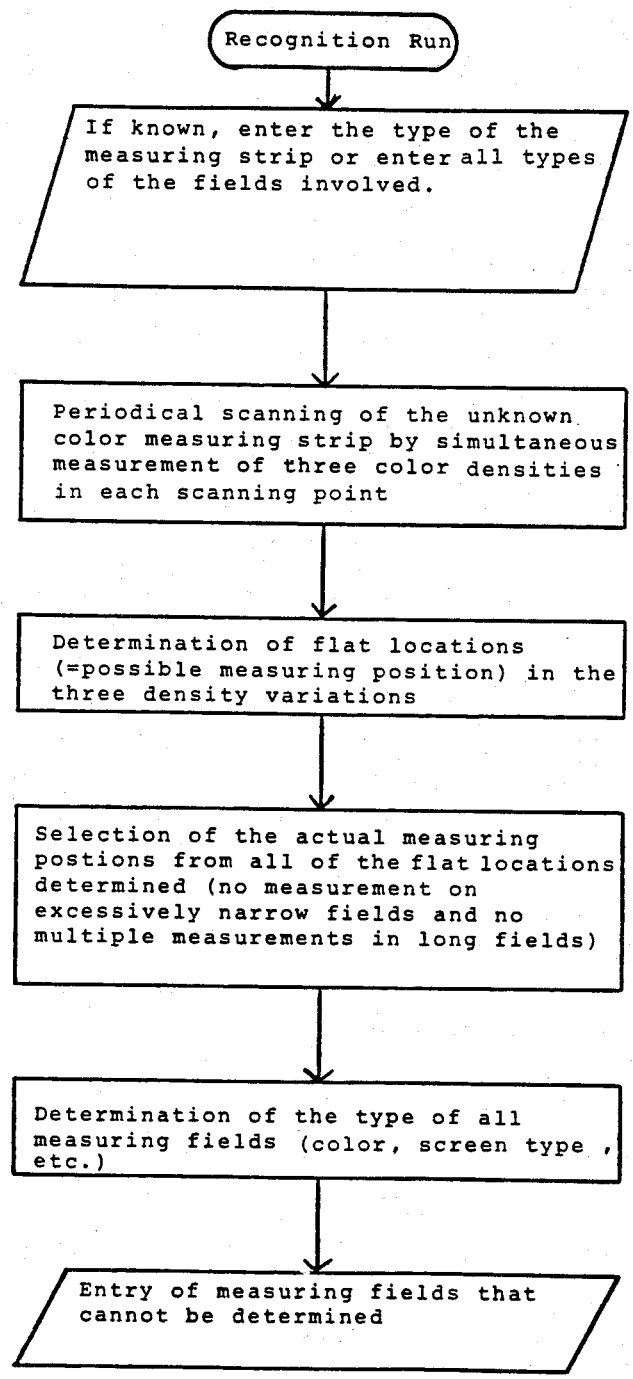
Figure 13:
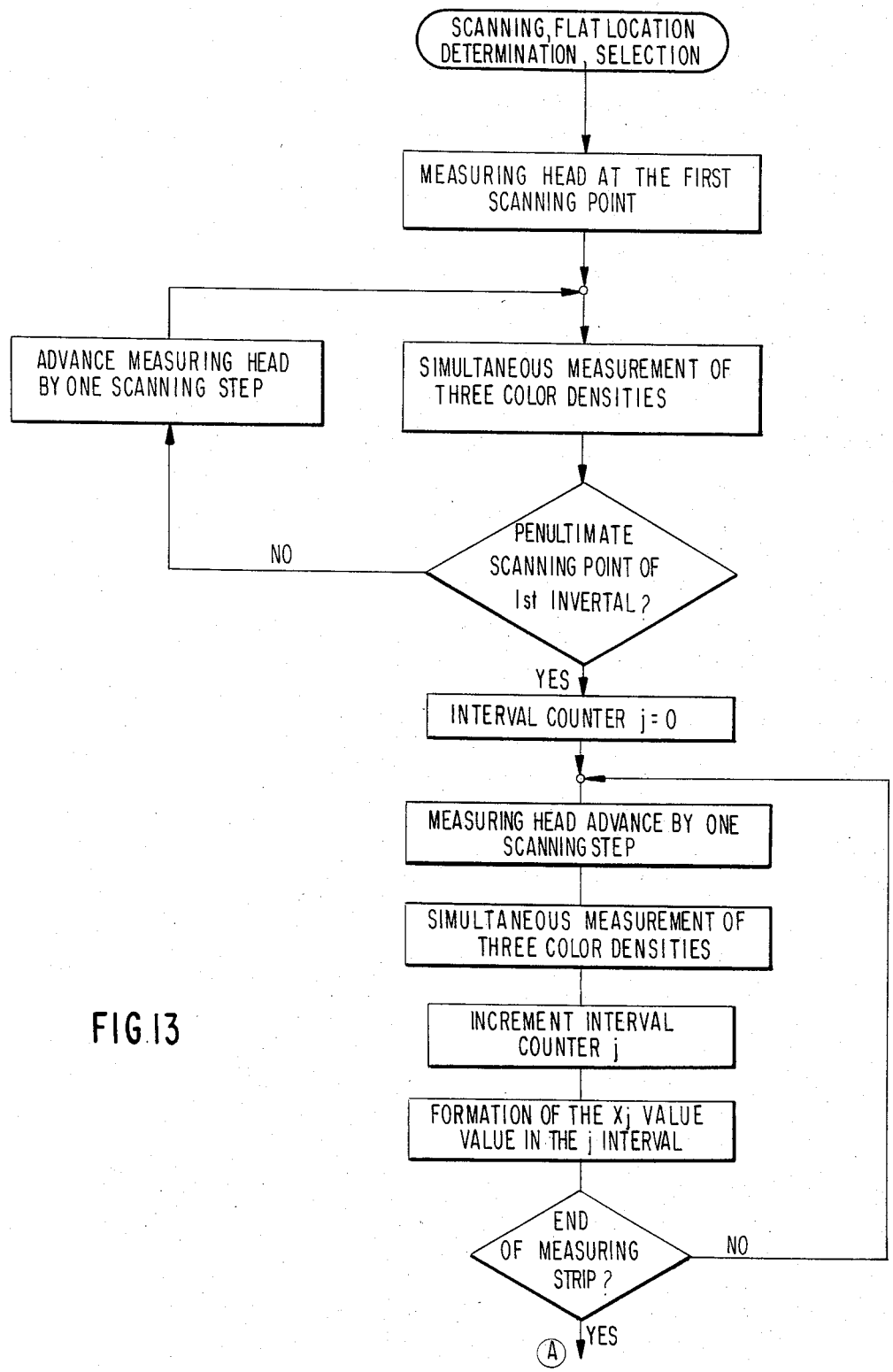
Figure 13A:
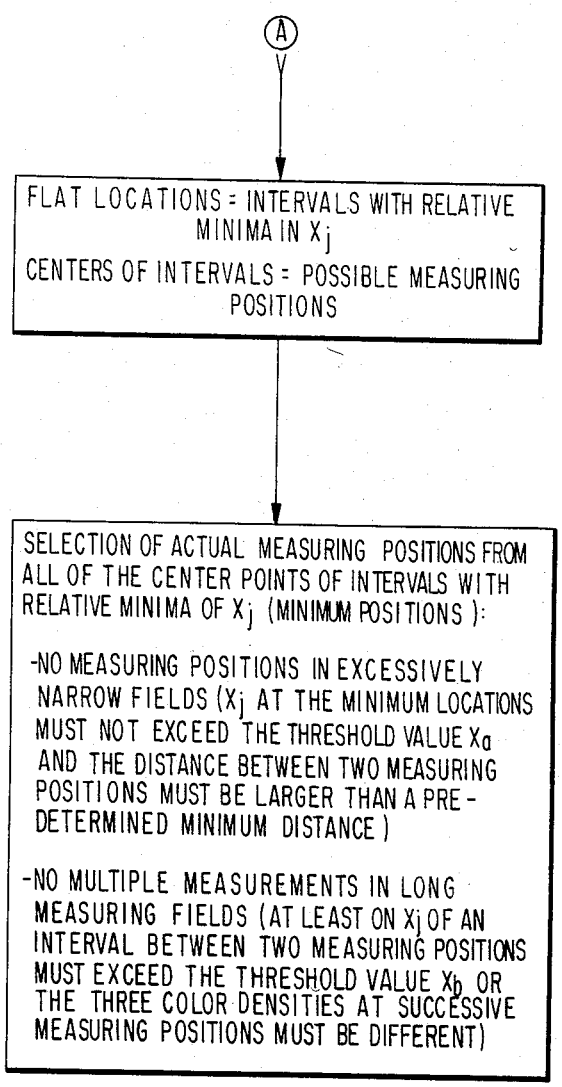
Figure 14:
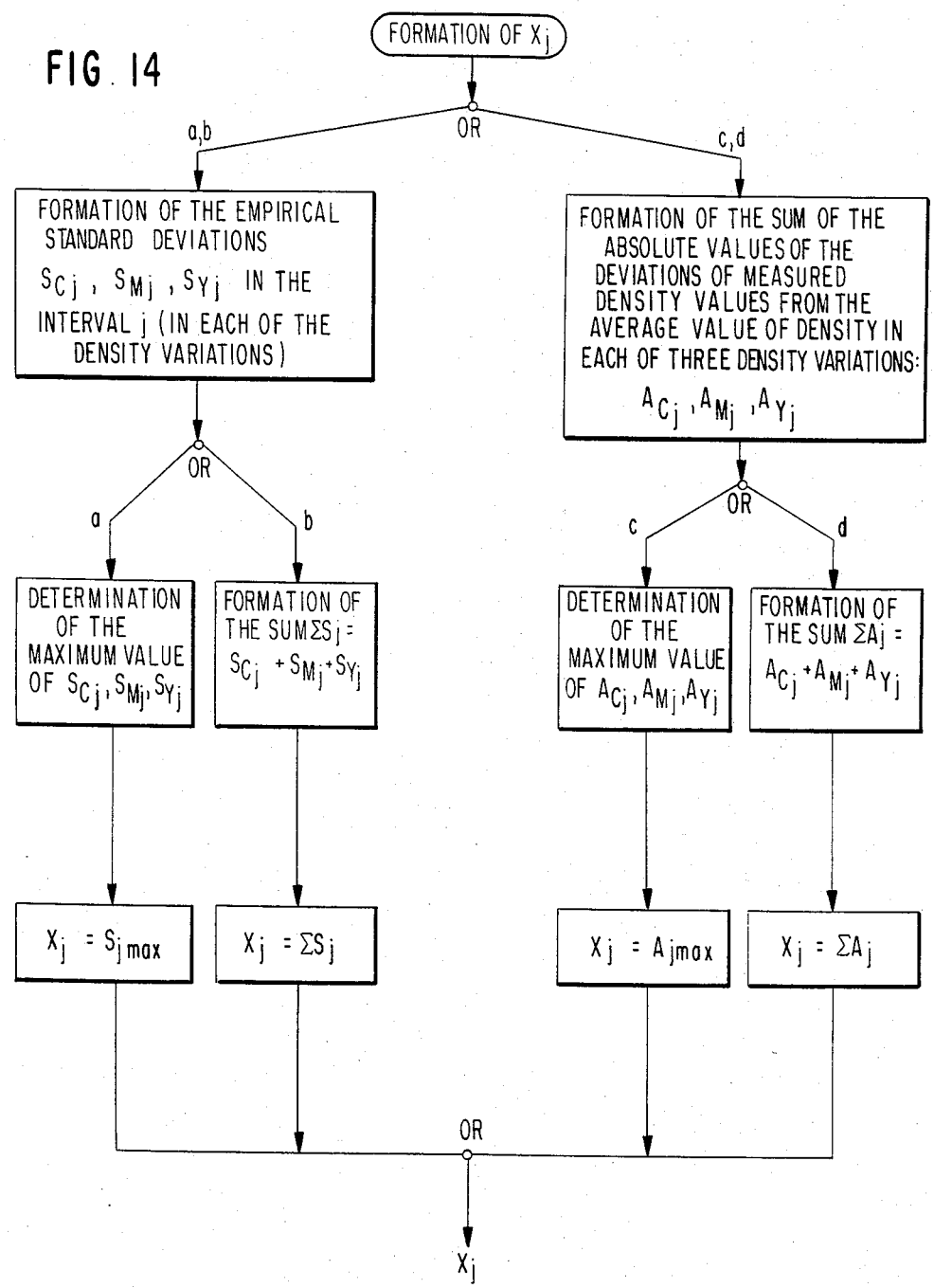

The flow diagram of FIG. 12 presents an overview of the individual steps of the recognition run. The steps of scanning, flat location determination and flat location selection in the goemetric analysis of measuring strips are represented in detail in the flow diagrams of FIGS. 13 and 14. On the basis of these flow diagrams, persons skilled in the art will encounter no difficulty in designing a suitable control program for the processor systems in the electronic unit 6 and in the personal computer 7.

Figure 15:
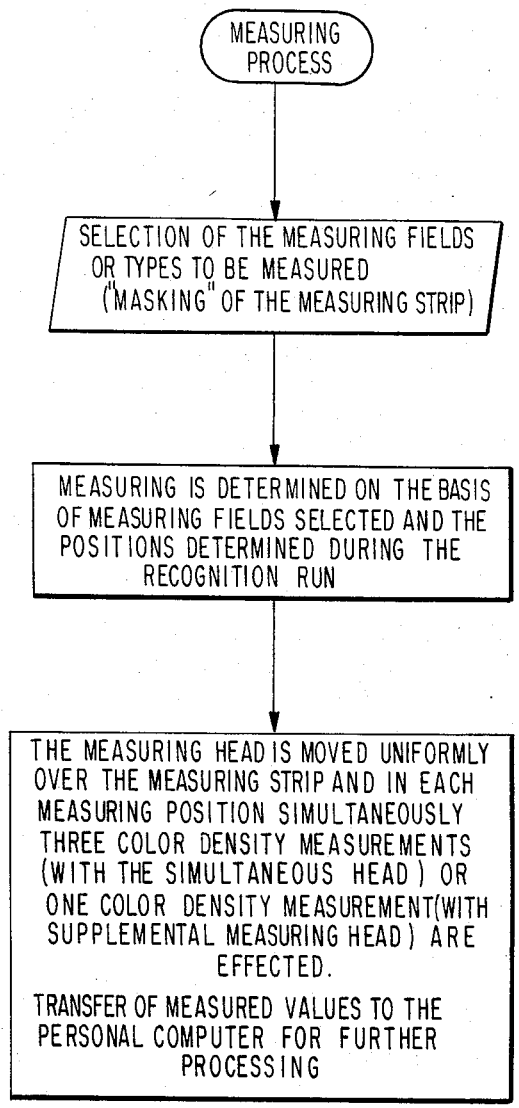

Following the completion of the analysis of the measuring strip, the measuring phase itself is effected. Initially, the measuring fields or field type(s) are entered (masking of the measuring field strip). From these input data and the possible measuring positions obtained during the recognition run, those that actually will be used, are selected (in an extreme case all of them may be used). Finally, the measuring carriage is guided uniformly over the measuring strip and at all of the locations of interest, the color densities are determined simultaneously in the three color channels. The measured values are processed by the electronic unit 6 and then passed on to the personal computer 7 for further processing and evaluation. The processing of the measured data itself is not an object of the invention. It should, however, be emphasized that this processing with the present state of the art may be utilized in the fully automatic control of the printing installation upon which the printed sheet containing the measuring strip is produced. The flow diagram of FIG. 15 generally shows an overview of the measuring process.

For the sake of completeness, it should be noted once more that the recognition and measuring runs are not necessarily effected separately, i.e., in two separate passages, but may be performed together. The measuring itself may also be effected for example during the return run of the measuring carriage after the recognition run. However, since as a rule the recognition run is effected only once for each type of measuring strip, this question is of little importance.

As mentioned hereinabove, the measuring carriage 3 is equipped with a supplemental measuring head 18 for special inks. These so-called decorative or house inks often used in the printing industry are of spectral composition different from normal printing inks and thus require specially adapted measuring filters in order to obtain a sufficiently high measuring resolution. In the absence of suitably adjusted densitometers, at the present time it usually suffices to measure these special inks with the standard filter yielding the highest density value. This, however, is frequently inadequate for the control of printing machinery. It is now possible by means of the supplemental or "piggyback" measuring head 18 to measure selectively standard and special printing inks with the same precision. Appropriately, the computer is then informed in the initial input data as to which color field (color) is to be measured with which filter. The selection of the proper filter is then controlled by the computer, together with the switching from the standard simultaneous measuring head 19 to the supplemental head 18 and conversely.

A further possible application of the scanning densitometer according to the invention arises in connection with the testing of line codes, in particular of the EAN code (European Article Numbering) of the UPC (Universal Product Code). EAN or UPC codes must satisfy certain requirements as specified in standards. For the testing of the codes, the line codes themselves and/or the test marks specified in the standards, may be used. The testing (of the printing quality) of these codes at the present time is performed by means of manual testing instruments, whereby a laser is passed over the test marks or the EAN or UPC code. No combination instruments whereby both color densities and EAN or UPC codes could be measured, are known, especially not mechanical ones. Heretofore two separate systems have been employed for such purposes; each has its own computer and the two are thus correspondingly expensive. Furthermore, the measuring processes for code testing and color measuring strips is independent and thus is time consuming.

According to a further embodiment of the invention, the supplemental measuring head 18 is designed as a line code reader and is joined with the simultaneous measuring head 19 in a conventional articulated and/or telescoping manner so that it can be easily positioned with respect to the EAN or UPC code present on the printed sheet. The analysis of the EAN or UPC test marks present in the printing control strip is similar to that of the measuring fields of the color measuring strips; i.e, the position of the measuring locations is determined in a recognition or positioning run, and the density measurement itself is effected in a separate measuring run and evaluated in a manner similar to the color measuring strip. Naturally, the color measuring strips and the EAN or UPC test marks may be scanned simultaneously or offset in time. The testing of the code is performed in the computer in any suitable manner and is not an object of the present invention.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A process for the colorimetric analysis of a printed color measuring strip by means of a scanning densitometer, the measuring head of which is guided along the measuring strip to be analyzed, thereby generating a plurality of color density values representing the color properties of the measuring strip, with said color density values being evaluated automatically for the recognition of the measuring fields of the color measuring strip and for the correlation of the color density values with the measuring fields, the process including the steps of guiding the measuring head along the color measuring strip in a recognition run, thereby scanning each measuring field in a multitude of scanning points so as to produce a multitude of color density values and determining from this multitude of color density values measuring positions suitable for the measuring process itself and further processing essentially only color density values originating in the determined measuring positions.

2. The process according to claim 1 wherein, the analysis of the color measuring strips is effected in two phases, whereby in the first phase a recognition run and in the second phase a separate measuring run are performed, with the color measuring strip being scanned in the second phase essentially only in the measuring positions determined in the recognition run.

3. The process according to claim 1 wherein, in an analysis of several printed sheets with the same color measuring strip, a recognition run is effected only for the first printed sheet, and the color measuring strips of the other printed sheets are scanned essentially only in the measuring positions determined during the recognition run.

4. The process for the colorimetric analysis of a printed color measuring strip by means of a scanning densitometer, the measuring head of which is guided along the measuring strip to be analyzed, thereby generating a plurality of color density values representing the color properties of the measuring strip, with said color density values being evaluated automatically for the recognition of the measuring fields of the color measuring strip and the correlation of the color density values with the measuring fields, the process including the steps of determining for each scanning location the color density values of the color measuring strip and analyzing their variations and, by means of this analysis determining scanning locations along the measuring strip which are located within flat sections of the variation of the color density values, wherein only color density values originating in measuring positions determined in this manner are used for further processing and display.

5. A process according to claim 4 wherein, the length of the color measuring strip is divided into equal, overlapping intervals, formulating for each interval a value $(X_j)$ related to flat locations of the density variations by striving for a characteristic, preferably extreme value, and selecting as the measuring positions those locations wherein said value is tending towards or is most clearly approaching the characteristic values.

6. A process according to claim 5 wherein, as a value $(X_j)$ related to flat locations, a value is selected which in the flat locations has absolute or relative extremes.

7. A process according to claim 6 wherein, the value $(X_j)$ comprises a function essentially containing the absolute sums of the deviations of the density values from the mean value of each of the three base colors or the corresponding standard deviations.

8. A process according to claim 7, wherein as the value $(X_j)$, the sum or the largest of the three absolute value sums or standard deviations of each interval (j) is selected.

9. A process according to claim 4 wherein, those flat locations in the variation of color density which are found in measuring fields under a predetermined minimum length or in the area of intermediate spaces between color measuring strip sections are not determined and recorded as measuring positions.

10. A process according to claim 6 wherein, only locations are determined as measuring positions, wherein the relative minima of the value $(X_j)$ is below a predetermined first threshold value $(X_a)$.

11. A process according to one of claims 4, 5, 6, 7, 8, 9 and 10 wherein, if two or more possible measuring positions are determined on the same measuring field (MF) of the color measuring strip, only one is selected and recorded.

12. Apparatus for the colorimetric analysis of a printed color measuring strip on a printed sheet, with a support surface for the sheet and a measuring head, guided on a bridge extending over the support surface and movable back and forth on said bridge by a motor, said head being designed for the photoelectric scanning of the color measuring strip on the printed sheet, and with an electronic control means for controlling the movements and measuring runs of the measuring head and for evaluating the measuring data generated by said measuring head, said control means including means for guiding the measuring head through a recognition run in incremental advance steps along the measuring strip wherein, after each advance step, the color density values of the color measuring strip are measured for each of the three base colors, and means for determining the configuration of the color measuring strip and locating and storing the measuring positions from which the measuring data of interest for the evaluation of the printed sheet are to be taken in response to said measured color density values.

13. Apparatus according to claim 12 wherein, the control means includes means for guiding the measuring head during a measuring run over the color measuring strip so that essentially only the measuring positions determined in the recognition run are scanned.

14. Apparatus according to claim 12 wherein, the measuring head includes means for simultaneously measuring the density values in all three base colors.

15. Apparatus according to claim 14 wherein, the control means includes means for evaluating, during the recognition run, the variation of the three color densities over the length of the color measuring strip for flat locations and for determining the measuring positions in the form of points within said flat locations, and means for storing said determined measuring positions.

16. Apparatus according to claim 13 including means connected to the control means for entering additional data concerning the configuration of the color measuring strip and/or the selection of measuring positions to be scanned during the measuring run.

17. Apparatus according to claim 12 including means for moving the measuring head under manual control.

18. Apparatus according to claim 12 wherein, the control means comprises at least one digital computer.

19. Apparatus according to claim 18 wherein, the control installation is equipped with a keyboard and an image screen terminal.

20. Apparatus according to claim 12 wherein, the control means installation includes means for optically displaying or outputting in another form the measured color density values of the color measuring strip and/or the data derived therefrom.

21. Apparatus according to claim 14 including a supplemental measuring head with exchangeable color filters for the measurement of special printing inks.

22. Apparatus according to claim 14 including an additional measuring head operable as a line code reader.

23. Apparatus according to claim 22 wherein, the control means includes means for testing line codes read by the additional line code measuring head.

24. Apparatus according to claim 21 wherein, the control means includes means for switching between the principal and the supplemental measuring head during the scanning of the color measuring strip in a programmed manner.

25. Apparatus according to claim 12 including means for generating luminous markings arranged along the moving path of the measuring head for the alignment of the printed sheet.

26. Apparatus according to claim 25 wherein, the luminuous markings are luminous lines.

27. Apparatus according to claim 25 wherein, said markings generating means comprises a source of light and an optical projection device and that the optical projection device is mounted for rotation around an axis parallel to its optical axis.

28. Apparatus according to claim 27 including at least one electromagnetic clamping block to secure a printed sheet on the support surface.

29. Apparatus according to claim 28 wherein, the clamping block is connected for actuation by the control means.

30. Process for the colorimetric analysis of a printed color measuring strip by means of a scanning densitometer, the measuring head whereof is guided mechanically along the measuring strip to be analyzed, thereby generating a plurality of color density values representing the color properties of the measuring strip, with said color density values being evaluated automatically for the recognition of the measuring fields of the color measuring strip and for the correlation of the color density values with the measuring fields, the process including the step of determining the structure of the color measuring strip and the measuring positions suitable for the measurement itself by determining with the measuring head, for each scanning location, the densities of the color measuring strip in three base colors, and determining the measuring positions for the subsequent measuring runs as those locations along the measuring strip whereat the three color density variations have flat sections.

31. A process according to claim 30 wherein, the analysis of the color measuring strip is effected during a common run in two phases, the first phase determining the structure of the color measuring strip and the measuring positions suitable for the measurements themselves, and the second phase performing said measurements.

* * * * *